July 18, 1967
F. D. HICKEY ETAL
3,331,375
APPARATUS FOR PREPARING FRUIT
Original Filed July 2, 1962
3 Sheets-Sheet 1
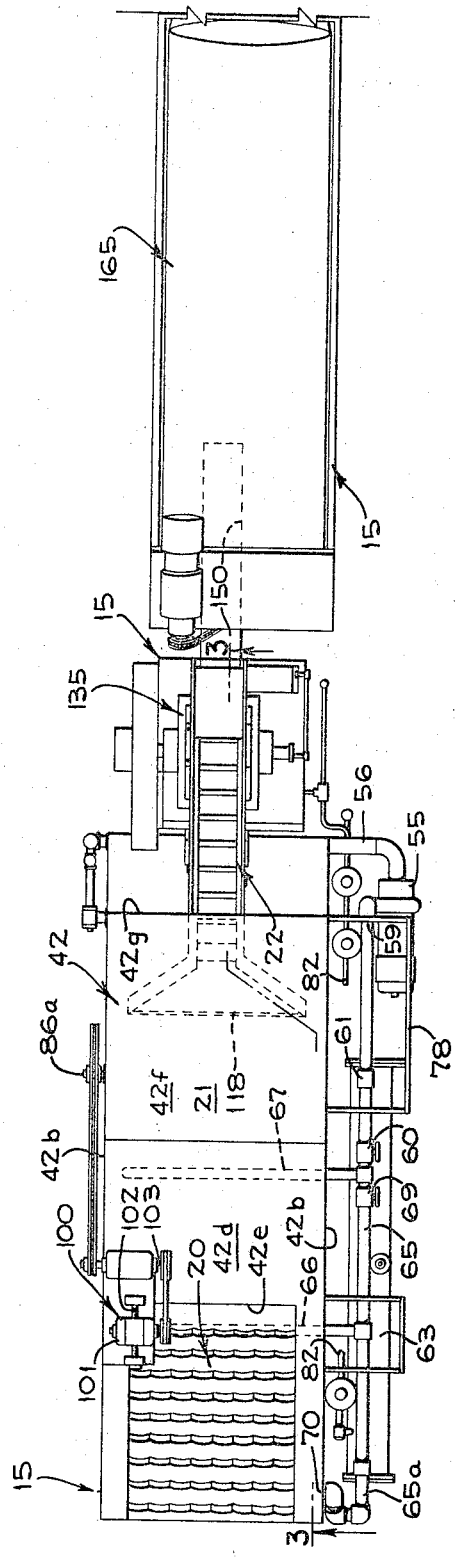
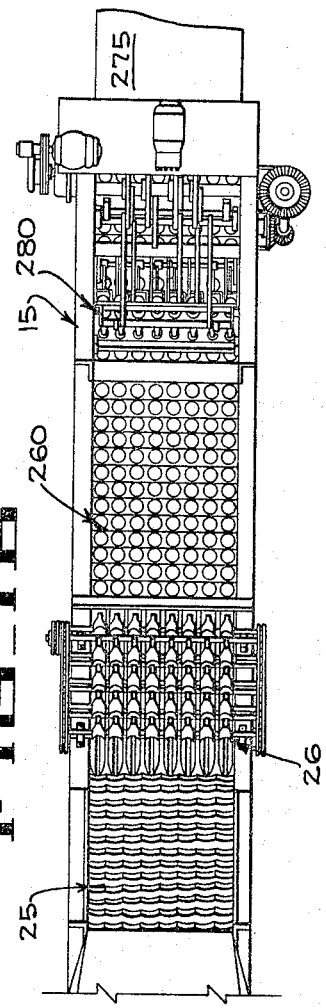
INVENTORS
FRANK D. HICKEY, HAROLD W. ADAMS
KATSUJI HIRAHARA, GERALD R. ANDERSON
DONALD W. CHAMBERLIN
BY
*Francis W. Anderson*
ATTORNEY

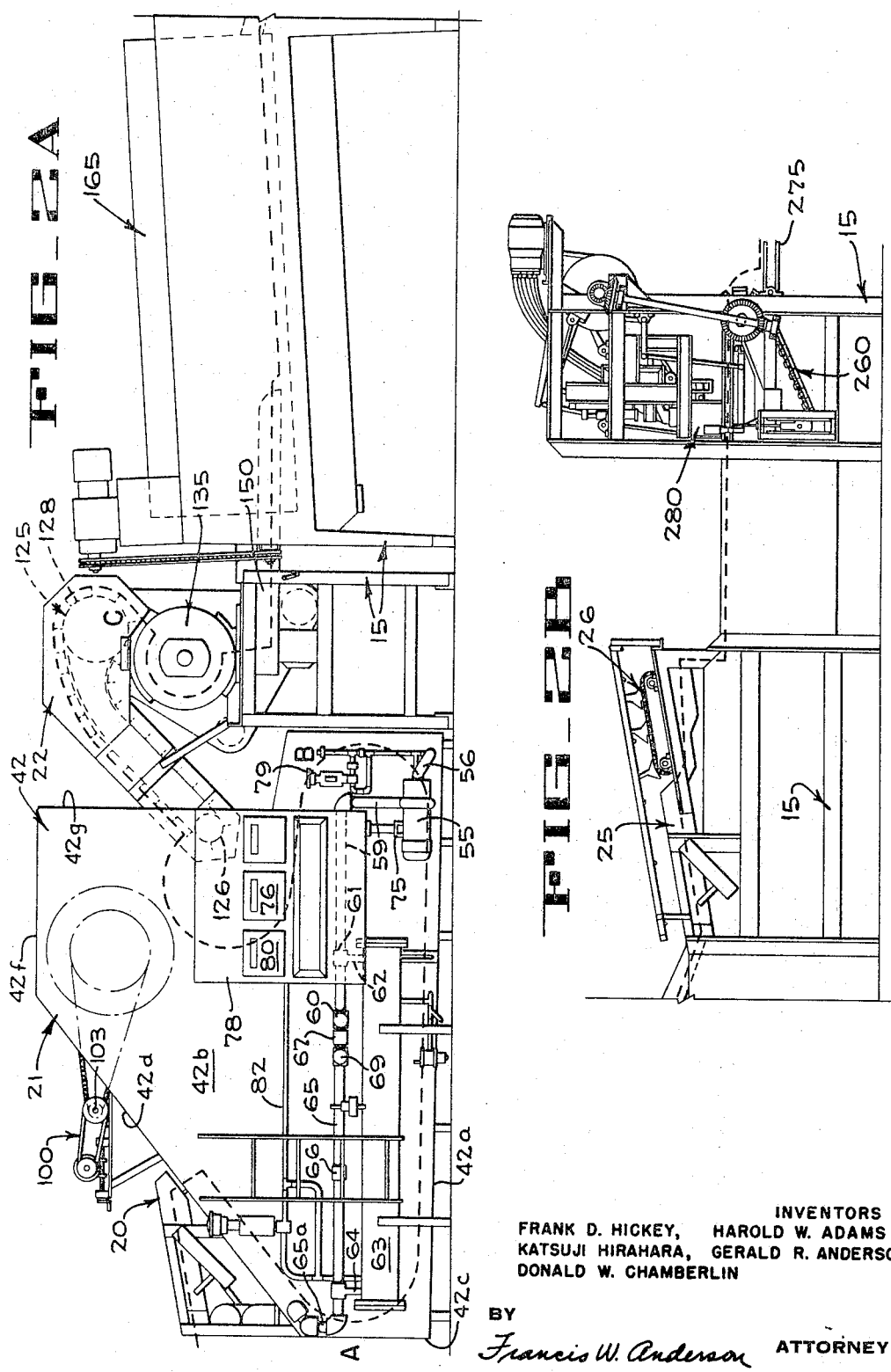

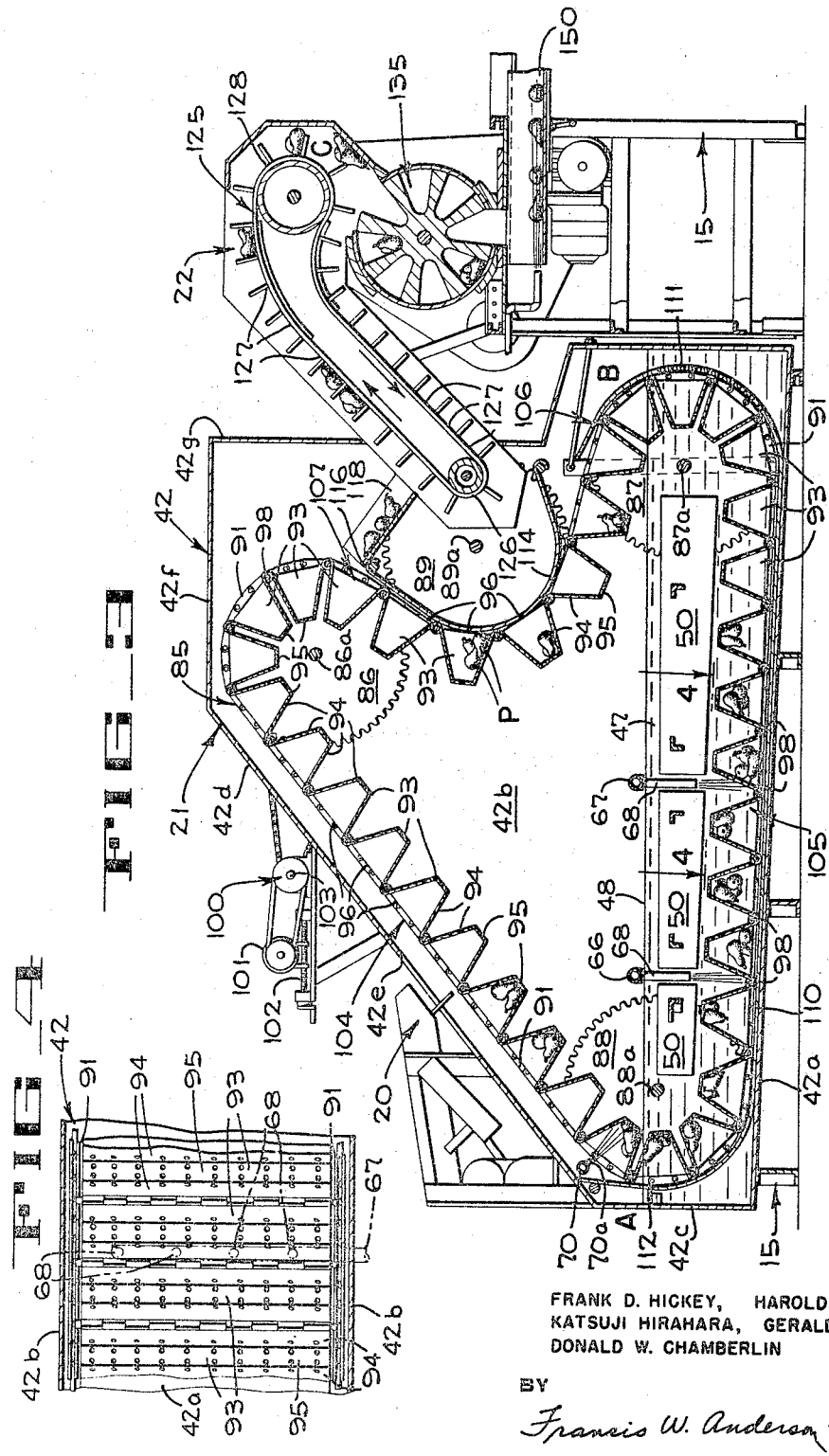

United States Patent Office 3,331,375
Patented July 18, 1967

3,331,375
APPARATUS FOR PREPARING FRUIT
Frank D. Hickey, Harold W. Adams, and Katsuji Hirahara, San Jose, and Gerald R. Anderson, Campbell, and Donald W. Chamberlin, Los Gatos, Calif., assignors to FMC Corporation, San Jose, Calif., a corporation of Delaware
Original application July 2, 1962, Ser. No. 206,786, now Patent No. 3,246,677, dated Apr. 19, 1966. Divided and this application Jan. 18, 1965, Ser. No. 434,731
4 Claims. (Cl. 134—127)

This application is a division of copending U.S. patent application of Frank D. Hickey et al., Ser. No. 206,786 filed July 2, 1962, now Patent No. 3,246,677.

The present invention pertains to apparatus for preparing fruit and, more particularly, to apparatus for chemically and mechanically preparing pome fruit for preservation, as by canning.

In preparing pears and other pome fruits for canning, it is desirable to remove the more inedible portions of the fruit including the peel, the stem, the seed cell, and the calyx with a minimum of loss of the more edible portion. Until the development of the present invention, it has been almost universal commercial practice to remove these inedible portions entirely by mechanical means. For example, knives have been used to remove the peel, the seed cell and the calyx, and a sharpened tube has been employed to remove the stem.

Although machines for mechanically preparing pears are widely used, many of them do not perform their peeling functions with maximum satisfaction. That is, such machines either peel so deeply as to waste edible portions, or they peel so lightly as to require subsequent hand trimming. Furthermore, it is difficult to overcome these problems in a mechanical peeler because of the variations in contour of pears.

Therefore, the present invention employs chemical peeling, that is, immersion of the pears in a fluid medium, so that the depth of fruit removed is more precisely controlled and so that there is a greater uniformity of surface treatment irrespective of the pear contour. The significant result is greater yield of edible fruit.

Chemical peeling of various fruits has been known, but the present invention makes chemical peeling of pome fruit commercially practicable whereas previously it has not been. That is, although it has been known that the peel of a pear, for example, could be removed by immersion of the pear in a lye bath, several problems have prevented the practical application of lye peeling for canning pears on a commercial basis.

One of these problems is the tendency of lye-peeled pears to turn brown at a rapid rate. More specifically, common lye peeling of stone fruits, such as peaches, involves immersion of the fruit in a hot lye solution of 1% to 5%, that is relatively dilute, concentration at or near its boiling point. Such a method of peeling as applied to pears requires from one to three minutes to disintegrate the skin but leaves a heated layer of plasmolyzed cells about 3/16 of an inch deep in the remaining pear flesh. This heated layer turns brown very rapidly, within approximately sixty seconds, probably due to enzymatic action or oxidation. If pears containing this brown layer are canned, the brown pigment diffuses through the flesh of the pears giving them a creamy to yellowish tint, rather than the white appearance of normal fruit. Accordingly, the commercial value of such discolored fruit is considerably reduced.

Therefore, it is an object of the present invention to provide a novel, efficient apparatus for chemically and mechanically preparing pome fruit, especially pears and apples, for preservation, as by canning.

Another object is to provide apparatus which renders the chemical peeling of pome fruit practical for commercial use.

Another object is to provide apparatus for caustically treating pome fruit.

Another object is to provide apparatus for chemically peeling whole pome fruit so that the fruit are conditioned for mechanical handling, subsequent to peeling, during stemming and coring operations.

Another object is to provide apparatus for peeling, stemming and coring pome fruit by cooperative chemical and mechanical actions so that the inedible portions of the fruit are removed whereas a maximum of edible portions are retained.

Another object is to provide apparatus for treating pome fruit so that a layer, including flesh alone or both skin and flesh, of fruit of predetermined depth is disintegrated, softened, cellularly damaged, or otherwise preconditioned for removal.

Another object is to provide an apparatus for immersing fruit in a treating liquid so that the entire outer surface of each fruit is substantially uniformly coated with treating liquid when the fruit is removed from the liquid.

These, together with other objects, will become apparent upon reference to the following description and accompanying drawings, in which:

FIGS. 1A and 1B are diagrammatic plans of two portions of a fruit preparing apparatus embodying the present invention, it being understood that the left end of the portion in FIG. 1B connects onto the right end of the portion in FIG. 1A in the actual apparatus.

FIGS. 2A and 2B are diagrammatic side elevations of the portions of the apparatus shown in FIGS. 1A and 1B, respectively.

FIG. 3 is an enlarged longitudinal section taken on line 3—3 in FIG. 1A and, at selected locations, showing pears being conveyed through the apparatus.

FIG. 4 is a fragmentary horizontal section taken on a plane indicated by line 4—4 in FIG. 3.

The embodiment of the processing line with which the apparatus of the instant application is shown comprises a rigid support frame, generally identified by the numeral 15, that includes several sections located along the entire fruit processing line shown in FIGURES 1A, 1B, 2A and 2B. A shuffle feeding unit 20, an immersing unit 21 which will be further described in detail, and a holding unit 22 are all mounted on the frame. The feeding unit is a shuffle feeder of the type disclosed in U.S. Patent No. 3,088,-577, issued to D. Chamberlin.

Fruit, such as pears, are discharged from the feeding unit 20 into the immersing unit 21 thence into the holding unit 22. From the holding unit the pears are discharged into a steaming unit 135 of the type disclosed in the U.S. Patent to De Back No. 2,638,137. Upon leaving the steaming unit the pears are received in a flume 150 where they are carried in a flow of water to a rotary brush washer 165. From the brush, where the skins of the pears are removed, they pass to a second shuffle feeding unit 25 similar to the unit 20, thence to a pear aligning unit 26 where they are positioned in a conveying unit 260. The conveying unit carries the pears past a stemming and coring unit 280 where the pears have their stems and cores removed and are discharged onto a takeaway conveyor 275. The takeaway conveyor then carries the pears to a subsequent processing station. The details of the foregoing apparatus and the method of processing the pears in which this apparatus may be employed may be had by referring to the aforementioned copending U.S. patent application of Frank D. Hickey et al., Ser. No. 206,786.

The pears are discharged from the feeding unit 20 into the immersing unit 21 (FIG. 3) which includes a housing 42 having a bottom wall 42a, side walls 42b (FIG. 4) and a forward wall 42c including a sloping portion 42d which provides an opening 42e directly beneath the discharge end of the first feeding unit 20. The housing 42 also has a top wall 42f and a rear wall 42g. The housing contains a lye bath 47 having an upper surface 48 which is below the level of the opening 42e. A plurality of displacement tanks 50, which are fixedly secured to the side walls of the housing, are immersed in the bath 47 below the upper surface thereof, and are spaced from the bottom, rear and front walls of the housing and from each other. The purpose of the tanks is to maintain the upper surface of the bath at a predetermined level while conserving the amount of lye required for the bath.

As will be more fully explained, the concentration and, especially the temperature of the lye bath 47 are important factors in the present method. Although the present invention is not limited to the illustrated apparatus for controlling concentration and temperature, such apparatus is briefly described to aid in a better understanding of the invention. Thus, to recirculate the lye solution of the bath, a pump 55 (FIG. 2A) is provided which has a suction connection communicating with a line 56 that extends through the side wall of the housing adjacent to the rear wall 42g, and an outlet port communicating with a pressure conduit 59 extending along one of the side walls 42b of the housing. A valve 60, which is connected in the conduit 59, is normally closed, causing the lye to flow through a T 61 and through a short conduit 62 to a steam-heated heat exchanger 63. The heated lye leaves the heat exchanger through a conduit 64 and flows into two oppositely directed branch conduits 65 and 65a. Front and rear manifolds 66 and 67 (FIG. 2A) are connected in the conduit 65 in spaced relation to each other and project transversely of conduit 65 (FIGS. 1A and 3) into the housing above the upper surface 48 of the bath 47. A plurality of liquid disturbing jets 68 (FIG. 3) are connected to each of the manifolds and extend down into the bath between adjacent displacement tanks 50. A valve 69 (FIG. 1A) is connected in conduit 65 on the upstream side of manifold 67 which also communicates with valve 60. When valve 60 is closed, all of the lye flows through the heat exchanger 63 and is discharged through manifolds 66 and 67. If valve 60 is opened and valve 69 is closed, part of the lye will flow directly into manifold 67 without going through the heat exchanger, while another portion of the lye will flow through the heat exchanger to manifold 66.

The branch conduit 65a directs a lye to a header 70 (FIG. 3) which extends across the interior of the housing 36 and has a plurality of short nozzles 70a for directing heated lye onto fruit being conveyed through the housing. If desired, a removable filter can be installed in branch conduit 65a.

In order to replenish the supply of lye in the bath 47, a lye make-up valve 75 (FIG. 2A) interconnects a source of lye having a concentration of approximately 50 percent, not shown, and the housing 42 and is controlled by a density controller 76 located in a control panel 78 mounted on one of the side walls 42b of the housing. This density controller, which may be of any commercial type such as the type marketed by Taylor Instrument Companies of Rochester, N.Y., measures the density of the lye in the tank by blowing air through a column of the lye and measuring the resistance of the lye to the passage of air. The controller is connected to the source of lye of 50% concentration and, when the concentration of the lye in the tank drops below the desired level, the controller 76 actuates the diaphragm valve 75 to admit more 50% lye to the tank. A float-controlled water valve 79 interconnects a source of water, not shown, and the housing for replenishing the supply of water in the bath. Due to the heat in the tank, water is constantly being evaporated. The valve 79 adds water to bring the solution up to the desired level. If the addition of water dilutes the solution excessively, the controller 76 operates to bring the concentration back to the desired level. In addition, a temperature controller 80 is mounted in the control panel and controls the temperature of steam in a steam line 82 leading to the heat exchanger 63.

For conveying the pears through the lye bath 47, a fruit immersing conveyor 85 (FIG. 3) is included in the immersing unit 21. The conveyor has a pair of upper sprockets 86, a pair of lower rear sprockets 87, a pair of lower front sprockets 88, and a pair of intermediate rear sprockets 89, the sprockets being keyed to shafts 86a, 87a, 88a and 89a respectively, that are rotatably mounted on the side walls 42b of the housing 42.

A pair of endless chains 91 are trained around the sprockets and are interconnected by a plurality of truncated trough-shaped conveying buckets 93 extending transversely between the chains. Each bucket has a pair of side walls 94 converging inward from the chains to a bottom wall 95 and an open top 96 spaced outward from its associated bottom wall. Furthermore, for a purpose to be described, the bottom wall and portions of the side walls adjacent to the bottom wall of each bucket are perforated. Adjacent side walls of adjacent buckets are pivotally connected to each other and to the chains by hinges 98 (FIGS. 3 and 4) which define bucket pivot axes extending transversely of the chains.

A conveyor drive mechanism, generally identified by the numeral 100 (FIGS. 2A and 3), includes an electric motor 101 which is mounted on a screw-type adjusting mechanism 102. The motor drives a shaft 103 through a well-known speed changing mechanism of the type wherein when the motor 101 is shifted relative to the shaft 103, the pitch of drive cones is automatically changed to vary the speed of shaft 103. The shaft 103 is connected through a chain to the shaft 86a of conveyor 85 for moving the buckets 93 downwardly along a pear receiving run 104 with the open tops of the buckets facing upward and passing successively under the opening 42e in housing 42, thence into the bath 47 at position A, thence along an immersing run 105 under the displacement tanks 50 with the buckets being inverted, thence out of the bath at position B, thence upwardly along a removing run 106 with the open tops of the buckets again facing up, and finally along a discharging run 107 wherein the buckets are gradually angled into a partially inverted position just before the buckets return to said receiving run.

In addition, the immersing unit 21 includes a lower fruit-retaining panel 110 secured to the bottom wall 42a of the housing 42 under the immersing run 105 of the conveyor 85. This panel has arcuate, outwardly projecting rear and front portions 111 and 112 concentric with the rear and front sprockets 87 and 88, respectively, the rear portion having perforations to permit flow of lye solution into the inlet 56 of the pump 55. Thus, the buckets 93 slide along this panel as they enter, traverse, and leave the immersing run 105. Also, an upper semi-cylindrical retaining panel 114 is mounted in the housing and extends transversely of the conveyor 85 between and concentric with the intermediate front sprockets 89. These panels cover the open tops 96 of the buckets 93 during inversion thereof along the immersing and discharging runs 105 and 107 and thereby insure the retention of the pears P in the buckets where such retention is desired. The upper retaining panel terminates in an upper edge 116, and a discharge chute 118 (FIGS. 1A and 3) mounted in the housing 42, declines rearwardly from the upper edge of the upper panel.

The holding unit 22 (FIG. 3) includes an elevator 125 having a lower end 126 projected into the housing 42 through the rear wall 42g thereof and under the discharge chute 118. The elevator provides a plurality of pockets 127 which carry pears received therein toward an upper end 128 of the elevator.

In the operation of the apparatus pears P are continuously delivered in bulk to the feeding unit 20. These pears may range from hard immature pears, intended for cocktail use, to soft mature pears, intended for grade packing. However, it will be understood that, in general, the pears that are processed during a particular period of operation of the present machine will have approximately the same condition of ripeness.

The feeding unit 20 discharges rows of pears in the buckets 93 as they pass under the opening 42e. The conveyor 85 lowers the pears into the lye bath 47, which is maintained at a concentration of from about ten percent to about twenty percent by weight of lye in water and at a temperature no more than about one hundred and sixty degrees Fahrenheit; in order to minimize process time, it is preferred that the temperature be held above about one hundred and forty degrees Fahrenheit, but this lower temperature is not critical as is the upper temperature limit. It is also preferred to include a wetting agent in the lye bath. About 0.2% to about 0.5% by weight of a wetting agent sold by Union Carbide and known as Tergitol 08 (sodium-2-ethyl-hexyl-sulfate) serves very well for this purpose. Just before each bucket of pears is submerged in the lye bath, the pears in each bucket are sprayed with a warm lye solution from the input nozzles 70a. The conveyor travels at a speed which keeps the pears immersed in the bath during the immersing run 105 for a period in the range of from about one minute to about four minutes, this time being measured from the moment the pears are immersed at position A to the moment the pears are removed from the bath at position B. As the pears travel along the immersing run, and before reaching the downwardly-directed fruit-disturbing jets 68, they are buoyed upwardly by the solution toward and against the bottom walls and the lower portions of the side walls of their buckets. However, the entire outer surface of each pear is substantially uniformly contacted by the lye solution since, as the buckets pass under the jets 68, the jets force lye solution downwardly through the perforations in the buckets 93, and, by disturbing the solution and pears in each bucket, the jets move the pears out of contact with their respective buckets and out of contact with each other. It is to be noted that FIG. 3 shows two of the buckets and the pears therein just after passing under the jets and also shows that, as buckets move farther away from the jets, the solution once again buoys the pears upwardly toward the bottom walls.

The conveyor 85 lifts the pears P out of the bath 47 at position B and carries them upwardly along the pear-removing run 106. The pears, now coated with lye, are slid along the upper fruit-retaining panel 114 by their respective buckets 93 and are eventually discharged onto the chute 118 which guides them into the pockets 127 of the elevator 125. The elevator lifts the pears toward its upper end 128 where, at position C, these pears are discharged into a steaming unit 135. The time during which the pears are held out of the bath, referred to as the holding step or holding time, from position B to position C, is carefully controlled so that the total time during which lye is in contact with each pear between position A and position C is in the range of from about two minutes to about six minutes. That is, not only are pears contacted with lye along the immersing run 105 for predetermined time, but they are additionally contacted by their individual coatings of lye from positions B to C along the conveyor and the elevator. Thus, the speed of the elevator is adjusted according to the speed of the conveyor, having in mind the total contact time desired. As a result of the immersing and holding steps, the skins of the pears are weakened and preconditioned for subsequent removal. The pears are then discharged from the steaming unit 135 into the flume 150, thence into the units located further along the processing line.

Although the apparatus has been described with reference to the particular method and apparatus disclosed in the Hickey et al. Patent No. 3,246,677, it is important to note that the instant apparatus may be utilized in different combinations and for performing other methods.

It will be understood that changes and modifications may be made in the apparatus disclosed without departing from the spirit and scope of the appended claims.

The invention having thus been described, what is believed to be new and desired to be protected by Letters Patent is:

1. In a fruit treating unit, a housing, a treating liquid in said housing, a fruit carrier adapted to confine fruit to be treated and having a perforate upper portion, means for moving the carrier through said liquid whereby said liquid buoys the fruit upwardly toward said upper portion of the carrier, and liquid ejecting means in said housing for forcing liquid downwardly through said perforate upper portion thereby to force the fruit away from said portion and from each other so as to allow the liquid to contact the entire periphery of the fruit while confined in said carrier.

2. In a fruit treating unit for treating buoyant fruit, a housing, said treating liquid containing a caustic solution which increases the density of the treating liquid, a treating liquid in said housing, a fruit carrier adapted to confine fruit to be treated and having a perforate portion, said perforate portion being defined by a closed end portion and an open end portion, means for moving the carrier through said liquid with said closed end portion above said open end portion whereby said liquid enters said carrier through said perforate portion to cover the fruit and the fruit are confined by said closed end portion and the buoyancy of the treating liquid, and means for agitating the fruit while confined in said carrier so as to move them downward in the carrier against the buoyancy of the treating liquid to separate adjacent fruit whereby the liquid contacts the entire periphery of the fruit.

3. The fruit treating unit defined by claim 2 wherein said fruit carrier includes a perforated open-ended trough, said means for moving said fruit carrier through said liquid includes means for positioning said trough with its open end facing downward, and said means for agitating the fruit includes at least one downwardly directed nozzle positioned to emit a stream of liquid at said perforated trough opposite said open-end whereby the buoyant fruit carried in said trough will be moved by said stream to effect complete coverage by the treating liquid.

4. The treating unit defined by claim 2 wherein said agitating means includes a stream of heated liquid.

References Cited

UNITED STATES PATENTS

| | | | |
|---|---|---|---|
| 899,017 | 9/1908 | Arnold | 134—130 X |
| 1,019,111 | 3/1912 | Wright | 134—73 |
| 1,732,180 | 10/1929 | Brogden | 99—156 |
| 1,736,813 | 11/1929 | Zuckermann | 134—73 X |
| 1,754,612 | 4/1930 | Cook | 134—127 X |
| 1,852,144 | 4/1932 | Brogden et al. | 99—156 |
| 1,919,185 | 7/1933 | Chapman | 134—124 X |
| 2,249,792 | 7/1941 | Skinner | 134—133 X |
| 2,321,016 | 6/1943 | De Back | 134—57 |
| 2,830,603 | 4/1958 | Vagim | 134—57 |
| 3,011,924 | 12/1961 | Rand | 134—75 X |
| 3,099,276 | 7/1963 | Bergendahl | 134—107 |
| 3,134,070 | 5/1964 | Meyer | 134—75 X |

FOREIGN PATENTS 346,671   7/1960   Switzerland.

CHARLES A. WILLMUTH, *Primary Examiner.*

R. L. BLEUTGE, *Assistant Examiner.*

UNITED STATES PATENT OFFICE
CERTIFICATE OF CORRECTION

Patent No. 3,331,375                      July 18, 1967

Frank D. Hickey et al.

It is certified that error appears in the above identified patent and that said Letters Patent are hereby corrected as shown below:

Column 2, line 69, "206,786." should read -- 206,786, now Patent No. 3,246,677. --. Column 6, line 22, after "housing" insert -- a treating liquid in said housing, --; lines 23 and 24, cancel "a treating liquid in said housing;".

Signed and sealed this 23rd day of September 1969.

(SEAL)
Attest:

Edward M. Fletcher, Jr.

Attesting Officer

WILLIAM E. SCHUYLER, JR.

Commissioner of Patents